United States Patent
Ackermann et al.

[11] Patent Number: 5,633,555
[45] Date of Patent: May 27, 1997

[54] MAGNETIC DRIVE ARRANGEMENT COMPRISING A PLURALITY OF MAGNETICALLY COOPERATING PARTS WHICH ARE MOVABLE RELATIVE TO ONE ANOTHER

[75] Inventors: Bernd Ackermann; Leo Honds, both of Aachen, Germany

[73] Assignee: U.S. Philips Corporation, New York, N.Y.

[21] Appl. No.: 391,734

[22] Filed: Feb. 21, 1995

[30] Foreign Application Priority Data

Feb. 23, 1994 [DE] Germany ............ 44 05 701.6

[51] Int. Cl.⁶ .................. H02K 7/10; H02K 49/00
[52] U.S. Cl. ......................... 310/75 D; 310/103
[58] Field of Search .................. 310/75 D, 103, 310/104, 105, 156

[56] References Cited

U.S. PATENT DOCUMENTS

| | | | |
|---|---|---|---|
| 3,301,091 | 1/1967 | Reese | 74/640 |
| 3,378,710 | 4/1968 | Martin | 310/104 |
| 3,645,650 | 2/1972 | Laing | 417/420 |
| 3,762,839 | 10/1973 | Laing | 417/420 |
| 3,936,683 | 2/1976 | Walker | 310/103 |
| 3,974,408 | 8/1976 | Fehr et al. | 310/103 |
| 4,146,805 | 3/1979 | Fehr et al. | 310/104 |
| 5,204,572 | 4/1993 | Ferreira | 310/156 |
| 5,270,600 | 12/1993 | Hashimoto | 310/75 D |
| 5,418,414 | 5/1995 | Ackermann et al. | 310/156 |

*Primary Examiner*—Steven L. Stephan
*Assistant Examiner*—Michael Wallace, Jr.
*Attorney, Agent, or Firm*—Edward Blocker

[57] ABSTRACT

A magnetic drive arrangement comprising a plurality of magnetically cooperating parts which are moveable relative to one another, one of the parts being connected to a drive shaft and one of the parts being stationary, the fields produced by the permanent magnets being modulated by soft-magnetic flux-carrying parts which include at least one toothed iron yoke, wherein structures are provided on both sides of the iron yoke to generate magnetic fields by means of permanent magnets at the sides facing the iron yoke, with the magnetic fields alternatively exhibiting north poles and south poles along the circumference.

7 Claims, 9 Drawing Sheets

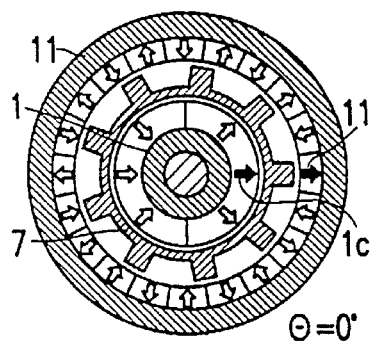
FIG. 2a  Θ=0°
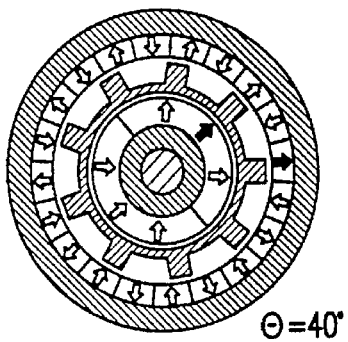
FIG. 2b  Θ=40°
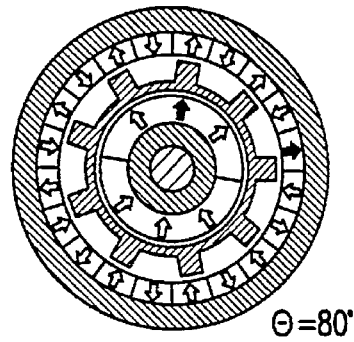
FIG. 2c  Θ=80°
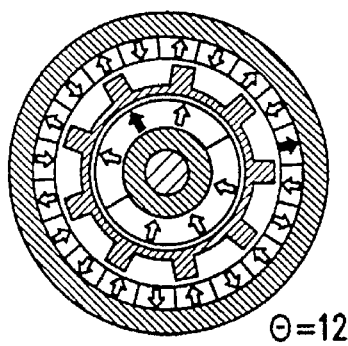
FIG. 2d  Θ=120°
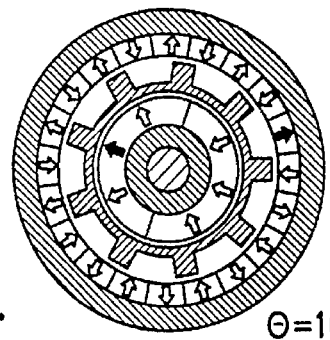
FIG. 2e  Θ=160°
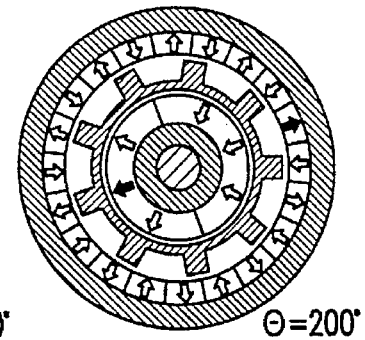
FIG. 2f  Θ=200°
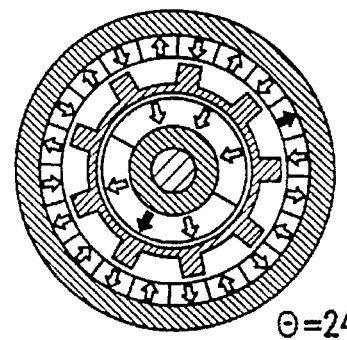
FIG. 2g  Θ=240°
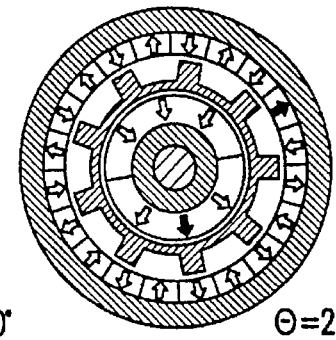
FIG. 2h  Θ=280°
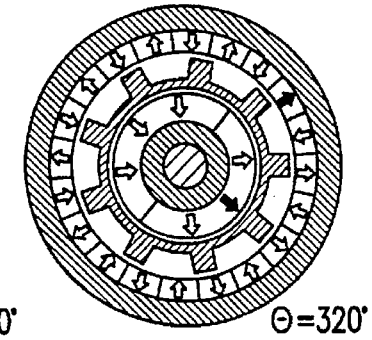
FIG. 2i  Θ=320°
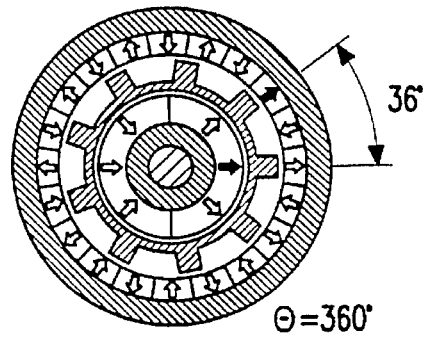
FIG. 2j  Θ=360°

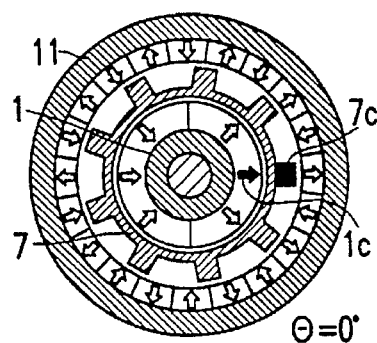
FIG. 3a  Θ=0°
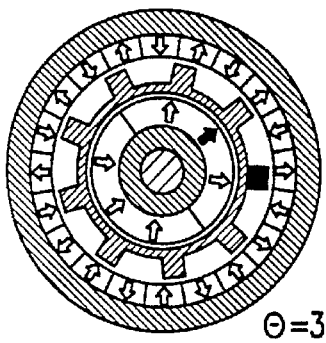
FIG. 3b  Θ=36°
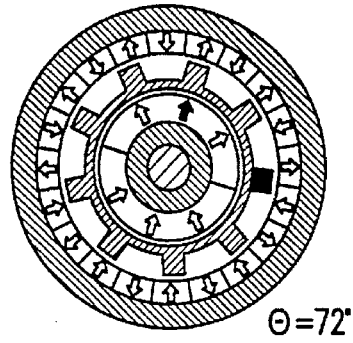
FIG. 3c  Θ=72°
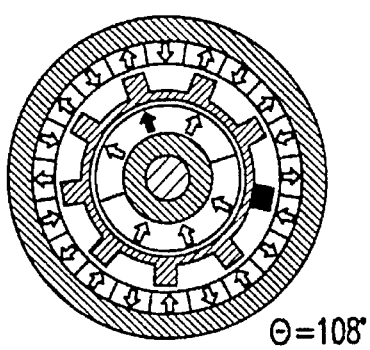
FIG. 3d  Θ=108°
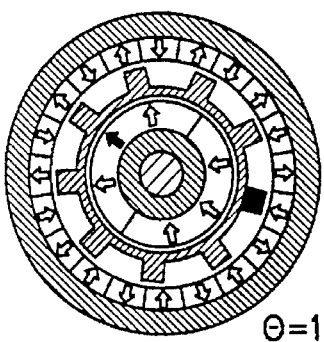
FIG. 3e  Θ=144°
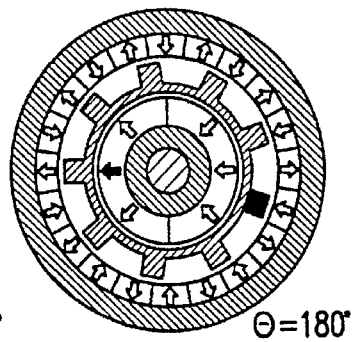
FIG. 3f  Θ=180°
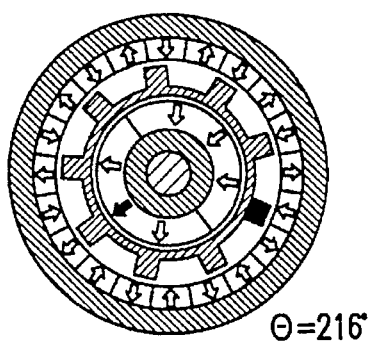
FIG. 3g  Θ=216°
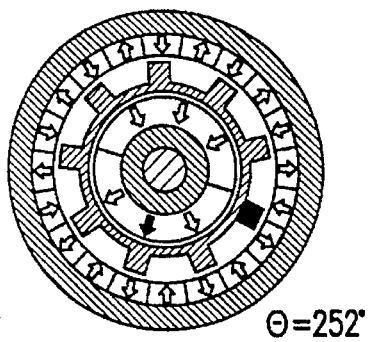
FIG. 3h  Θ=252°
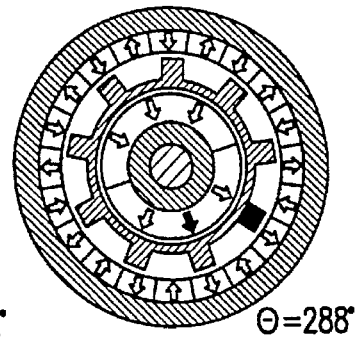
FIG. 3i  Θ=288°
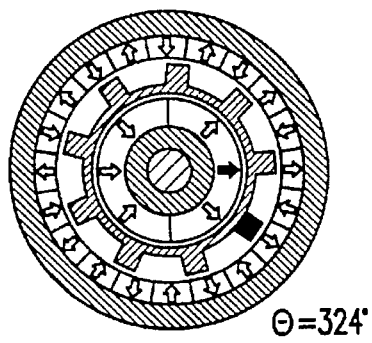
FIG. 3j  Θ=324°
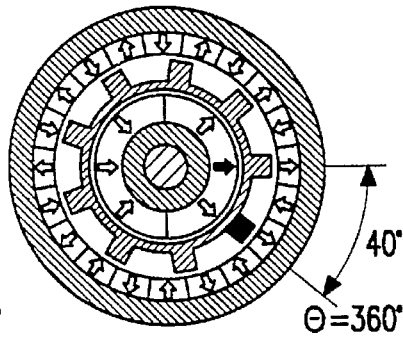
FIG. 3k  Θ=360°  40°

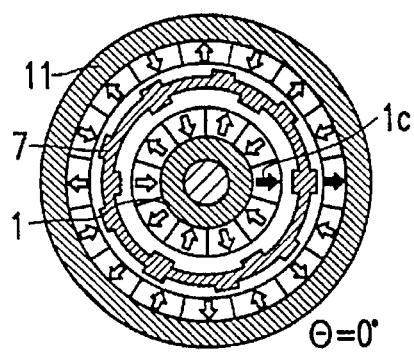
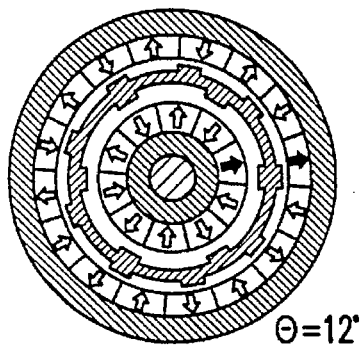
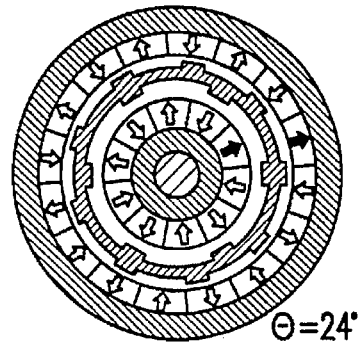
FIG. 7a     FIG. 7b     FIG. 7c
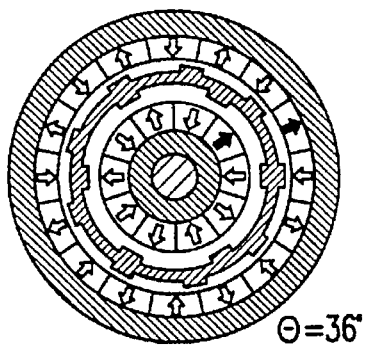
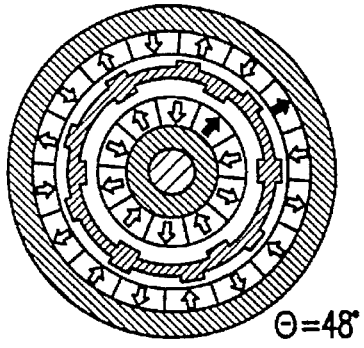
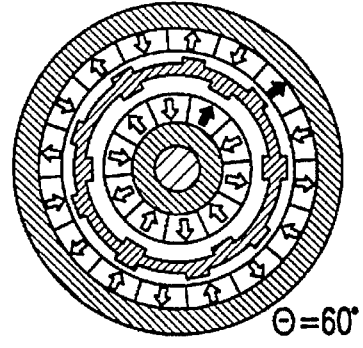
FIG. 7d     FIG. 7e     FIG. 7f
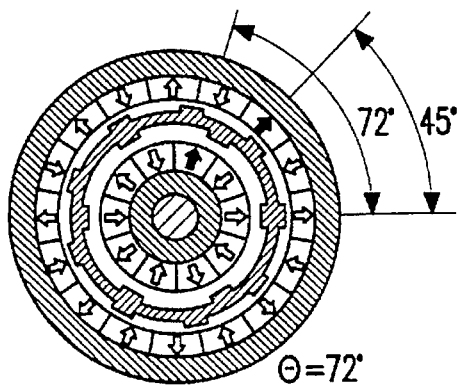
FIG. 7g

MAGNETIC DRIVE ARRANGEMENT COMPRISING A PLURALITY OF MAGNETICALLY COOPERATING PARTS WHICH ARE MOVABLE RELATIVE TO ONE ANOTHER

The invention relates to a magnetic drive arrangement comprising a plurality of magnetically cooperating parts which are movable relative to one another, one of said parts being connected to a drive shaft and one of said parts being stationary, the fields produced by the permanent magnets being modulated by soft-magnetic flux-carrying parts which include at least one toothed iron yoke.

A magnetic drive arrangement of the type defined in the opening paragraph is known from U.S. Pat. No. 3,301,091. In said arrangement a drive shaft drives an inner drive wheel having alternating north poles and south poles along its circumference. A soft-magnetic iron yoke surrounds the drive wheel and is smooth at its inner side adjacent the air gap and has radial teeth at its outer side. An outer iron yoke is disposed opposite these teeth and has inner teeth adjacent the air gap. The numbers of teeth are different. The iron yoke surrounding the drive wheel is connected to a drive shaft. The outer yoke is stationary. This construction has the disadvantage that the transmitted torques are small because only one part with magnetic excitation is used.

It is an object of the invention to provide a magnetic drive arrangement of the type defined in the opening paragraph, which is capable of transmitting larger torques. According to the invention this object is achieved in that a) structures are provided at both sides of the iron yoke to generate magnetic fields by means permanent magnets at the sides facing the iron yoke, which magnetic fields alternately exhibit north poles and south poles along the circumference, b) the structure at one side has $p_1$ pairs of north and south poles, the iron yoke having $Z_1 = p_1 \pm N$ teeth at the side facing this structure, N being an integer (N=1, 2, 3, . . . ), c) the structure at the other side has $p_2$ pairs of north and south poles, the iron yoke having $Z_2 = p_2 \pm M$ teeth at the side facing this structure, M being an integer (N=1, 2, 3, . . . ) and M being equal to N.

This magnetic drive arrangement has the advantage that it has two parts with magnetic excitation and the torque which can be transmitted is therefore substantially larger.

In a further embodiment of the invention the teeth on the iron yoke are uniformly spaced along the circumference. This results in the uniformity of the torque variation being further improved.

In a further embodiment of the invention the iron yoke and the structures are concentric with one another. This results in a maximal magnetic coupling between the parts along the entire circumference.

In a further embodiment of the invention in the case of a combination of $p_1$ equal to N or $p_2$ equal to N the number of teeth of the iron yoke at this side is zero.

In a further embodiment of the invention the iron yoke is stationary. The iron member can then form part of, for example, a partition wall when a torque is to be transmitted into a vacuum. As a result, the function of a magnetic clutch is performed in addition to the driving function. In a conventional magnetic coupling the partition wall attenuates the magnetic coupling forces whereas in the present case it actively assists in coupling.

In a further embodiment of the invention one of the two structures producing magnetic fields by means of permanent magnets is stationary. For example, if the outer structure is stationary it can also be used as a housing wall.

In a further embodiment of the invention the magnetic fields in the air gaps at both sides of the iron yoke extend substantially radially. This largely compensates for the forces acting on the iron yoke and on the outer structures.

In a further embodiment of the invention the magnetic fields in the air gaps at both sides of the iron yoke extend substantially axially. This enables a very flat construction to be obtained.

The invention will now be described in more detail, by way of example, with reference to the drawings. In the drawings:

FIG. 1 shows a magnetic drive arrangement comprising two structures, of which the inner structure is rotated by a drive shaft, which structures at the side which faces the iron yoke interposed between them produce magnetic fields by means of permanent magnets, which fields alternately exhibit north poles and south poles along the circumference, either the iron yoke or the outer structure being stationary and the non-stationary part being connected to a drive shaft, FIGS. 2a to 2j illustrate the cycles of movement of the magnetic drive arrangement of FIG. 1 when the iron yoke is stationary, FIGS. 3a to 3k illustrate the cycles of movement of the magnetic drive arrangement of FIG. 1 when the outer structure is stationary, FIG. 4 shows a magnetic drive arrangement as shown in FIG. 1 but which differs in that the outer structure has one pair of north and south poles less, FIGS. 5a to 5j illustrate the cycles of movement of the magnetic drive arrangement of FIG. 4 when the iron yoke is stationary, which differ from the cycles of movement shown in FIG. 2 in that the direction of rotation of the outer structure has been reversed, FIG. 6 shows a modification of the embodiment shown in FIG. 4, which modification has also teeth at its inner side, FIGS. 7a to 7g illustrate the cycles of movement of the magnetic drive arrangement of FIG. 6 when the iron yoke is stationary, FIG. 8 is a diagram relating to FIG. 1, in which diagram the radial component of the magnetic field produced at the inner side of the iron yoke by the inner structure is plotted as a function of the circumferential angle, FIG. 9 is a diagram relating to FIG. 1, in which diagram the radial component of the magnetic field produced at the outer side of the iron yoke by the inner structure is plotted as a function of the circumferential angle, which component results from the modulation of the magnetic field of FIG. 8 by the toothed iron yoke, FIG. 10 is a diagram relating to FIG. 1, in which diagram the radial component of the magnetic field produced at the inner side of the outer structure by the outer structure is plotted as a function of the circumferential angle, in which the influence of the teeth of the iron yoke is not shown for the sake of clarity, FIG. 11 represents the radial components of the magnetic fields produced in the air gap between the outer structure and the iron yoke as a result of the action of the outer structure (see FIG. 10) and the action of the inner structure (see FIG. 9), which illustrates that field peaks appear at the same positions along the circumference.

FIG. 1 shows a rotor 1, which serves as the inner structure of a magnetic drive arrangement. This rotor 1 comprises an iron ring 1a mounted on a shaft 3. The iron ring 1a carries permanent magnets 1b which form a north pole and a south pole at the outer circumference of the rotor. A soft-iron yoke 7 surrounds the rotor 1 and thereby defines an air gap 5. The inner side 7a of the soft-iron yoke 7 is smooth and the outer side 7b has teeth 7c. A ring 11 surrounds the iron yoke 7 and thereby forms another air gap 9. The ring 11 forms the outer structure of the magnetic drive arrangement. The ring 11 consists of an iron yoke 11a and a magnet ring 11b which adjoins the air gap 9 and which has alternate north poles and south poles at its inner side. The rotor 1, the soft-iron yoke 7 and the outer ring 11 are concentric with one another. In an embodiment shown in FIG. 3 the soft-iron yoke 7 is connected to a drive shaft, not shown, and the outer ring 11 is stationary. In another embodiment shown in FIG. 2 the outer ring 11 is connected to a drive shaft, not shown, and the soft-iron yoke 7 is stationary.

In the embodiments shown in FIGS. 1 to 3 the rotor 1 has one pair of north and south poles ($p_1=1$), the soft-iron yoke 7 is smooth at its inner side 7a ($Z_1=0$) and has nine teeth 7c ($Z_2=9$) at its outer side 7b. The outer ring 11 has ten pairs of north and south poles ($p_2=10$) at its inner side.

FIG. 2 shows some rotational positions of the outer ring 11, when the rotor 1 is rotated and no external forces act on the outer ring 11. The rotor 1 is then rotated in steps of 40°. This is illustrated by darkening one of the arrows 1c on the rotor 1 which indicate the local direction of magnetisation of the permanent magnets. Likewise, one of the arrows 11c indicating the local direction of magnetisation of the permanent magnets on the outer ring 11 is darkened. FIG. 2 illustrates the operation of the drive arrangement, the outer ring 11 being rotated anti-clockwise through 36° when the rotor 1 is rotated 360° in the anti-clockwise direction.

FIG. 3 shows some rotational positions of the soft-iron yoke 7, when the rotor 1 is rotated and no external forces act on the soft-iron yoke 7. The rotor 1 is then rotated in steps of 36°. This is illustrated by darkening one of the arrows 1c on the rotor 1 which indicate the local direction of magnetisation of the permanent magnets. Likewise, a tooth 7c on the soft-iron yoke 7 is darkened. FIG. 3 illustrates the operation of the drive arrangement, the soft-iron yoke 7 being rotated clockwise through 40° when the rotor 1 is rotated 360° in the anti-clockwise direction.

FIG. 4 corresponds to FIG. 1. The only difference is that the outer ring 11 has a different number of pairs of north and south poles, i.e. $p_2=8$.

FIG. 5 shows some rotational positions of the outer ring 11 for the magnetic drive arrangement in FIG. 4, when the rotor 1 is rotated and no external forces act on the outer ring 11. The rotor 1 is then rotated in steps of 40°. This is illustrated by darkening one of the arrows 1c on the rotor 1 which indicate the local direction of magnetisation of the permanent magnets. Likewise, one of the arrows 11c indicating the local direction of magnetisation of the permanent magnets on the outer ring 11 is darkened. FIG. 5 illustrates the operation of the drive arrangement, the outer ring 11 being rotated clockwise through 45° when the rotor 1 is rotated 360° in the anti-clockwise direction. In comparison with FIG. 2 the direction of rotation of the outer ring 11 is now reversed as a result of the different number of north and south poles of this ring.

The examples described until now illustrate the general relationship between the number of pairs of north and south poles on the rotor 1 ($p_1$) and on the outer ring 11 ($p_2$) and the relationship between torque and number of revolutions of these two parts when the soft-iron yoke 7 is stationary. The torque $T_1$ on the rotor and the torque $T_2$ on the outer ring 11 are in the same ratio to one another as the corresponding numbers of pairs of north and south poles: $T_1/T_2=p_1/p_2$. The number of revolutions $n_1$ of the rotor 1 and the number of revolutions $n_2$ of the outer ring 11 are in a ratio to one another which is the inverse of the ratio between the corresponding numbers of pairs of north and south poles: $n_1/n_2=p_2/p_1$.

In FIG. 6 the outer ring 11 and the configuration at the air gap 9 correspond to those in the embodiment shown in FIG. 4. The soft-iron yoke 7 also has teeth 7d at the inner air gap 5. In the present case the number of pairs of north and south poles of the magnet ring 1b is $p_1=5$. The number of teeth of the soft-iron yoke 7 at the inner air gap 5 is now $Z_1=6$.

FIG. 7 shows some rotational positions of the outer ring 11 for the magnetic drive arrangement in FIG. 6, when the rotor 1 is rotated and no external forces act on the outer ring 11. The rotor 1 is now rotated in steps of 12°. This is illustrated by darkening one of the arrows 1c on the rotor 1 which indicate the local direction of magnetisation of the permanent magnets. Likewise, one of the arrows 11c indicating the local direction of magnetisation of the permanent magnets on the outer ring 11 is darkened. FIG. 7 illustrates the operation of the drive arrangement, the outer ring 11 being rotated anti-clockwise through 45° when the rotor 1 is rotated through 72° in the anti-clockwise direction.

In FIGS. 8 to 11 the radial component of the field is directed outwards for a positive amplitude and inwards for a negative amplitude.

Figure 1:
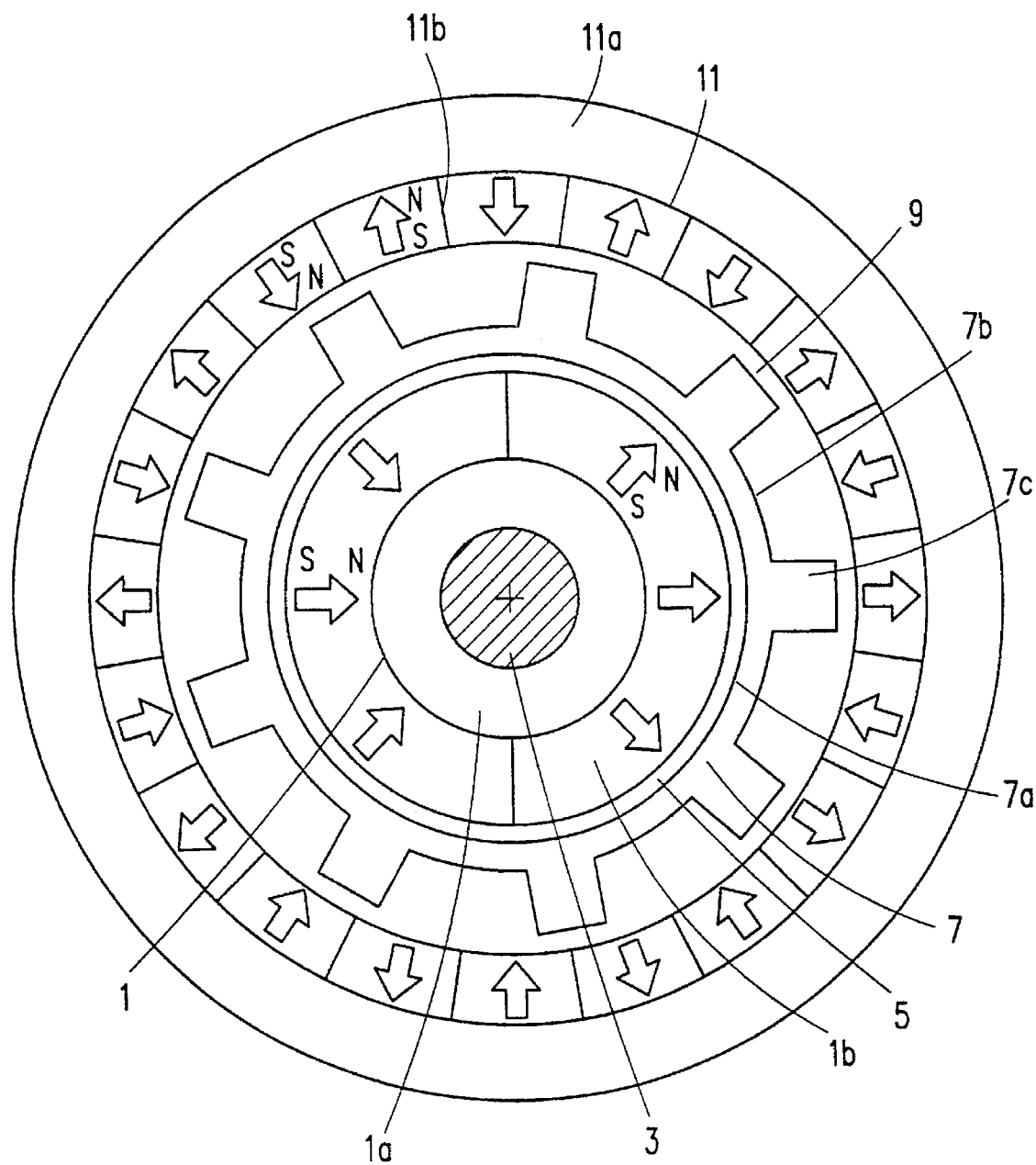
Figure 4:
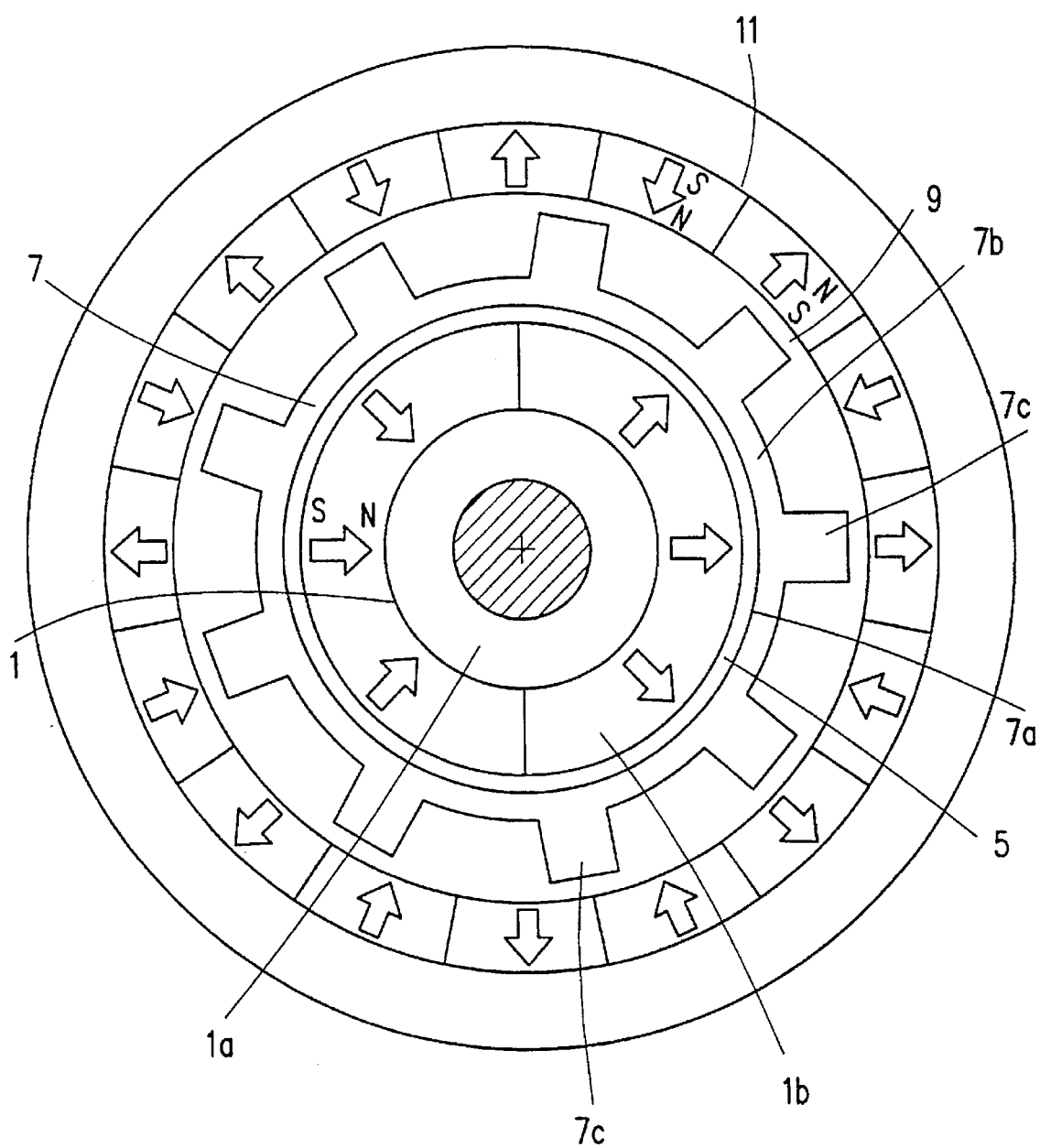
Figure 5A:
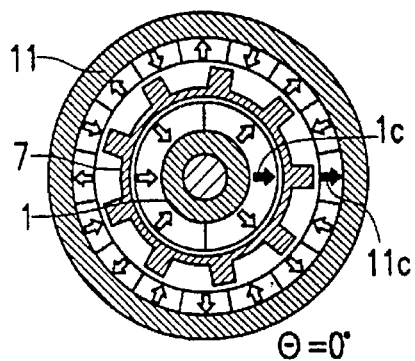
Figure 5B:
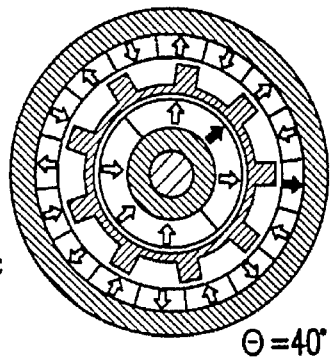
Figure 5C:
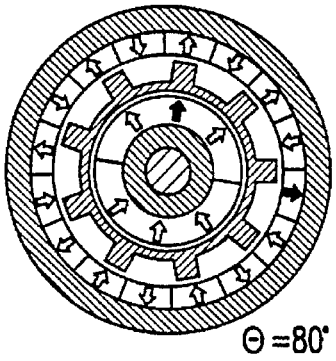
Figure 5D:
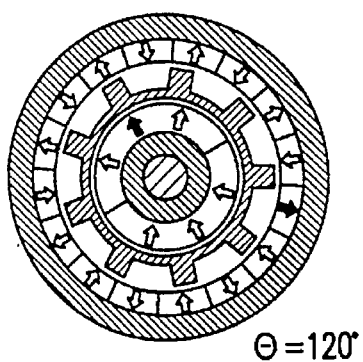
Figure 5E:
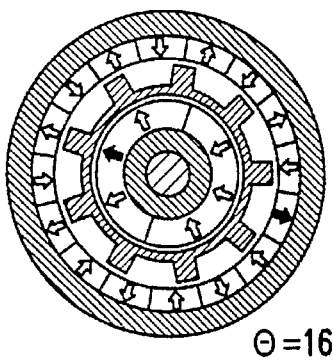
Figure 5F:
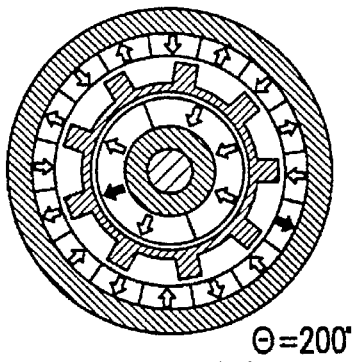
Figure 5G:
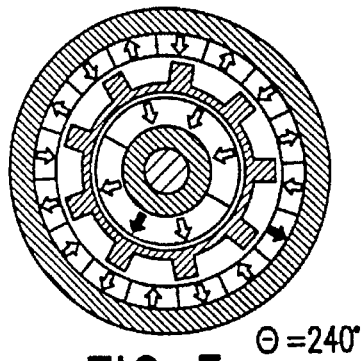
Figure 5H:
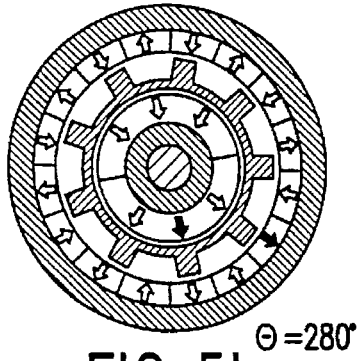
Figure 5I:
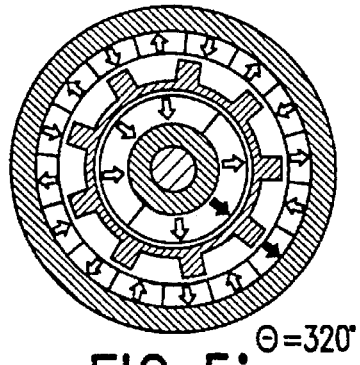
Figure 5J:
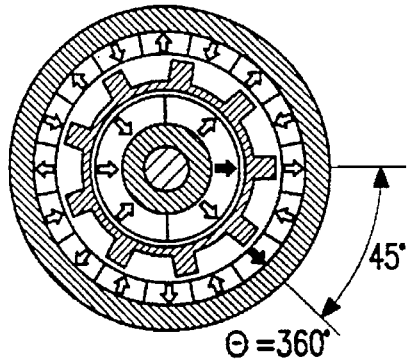
Figure 6:
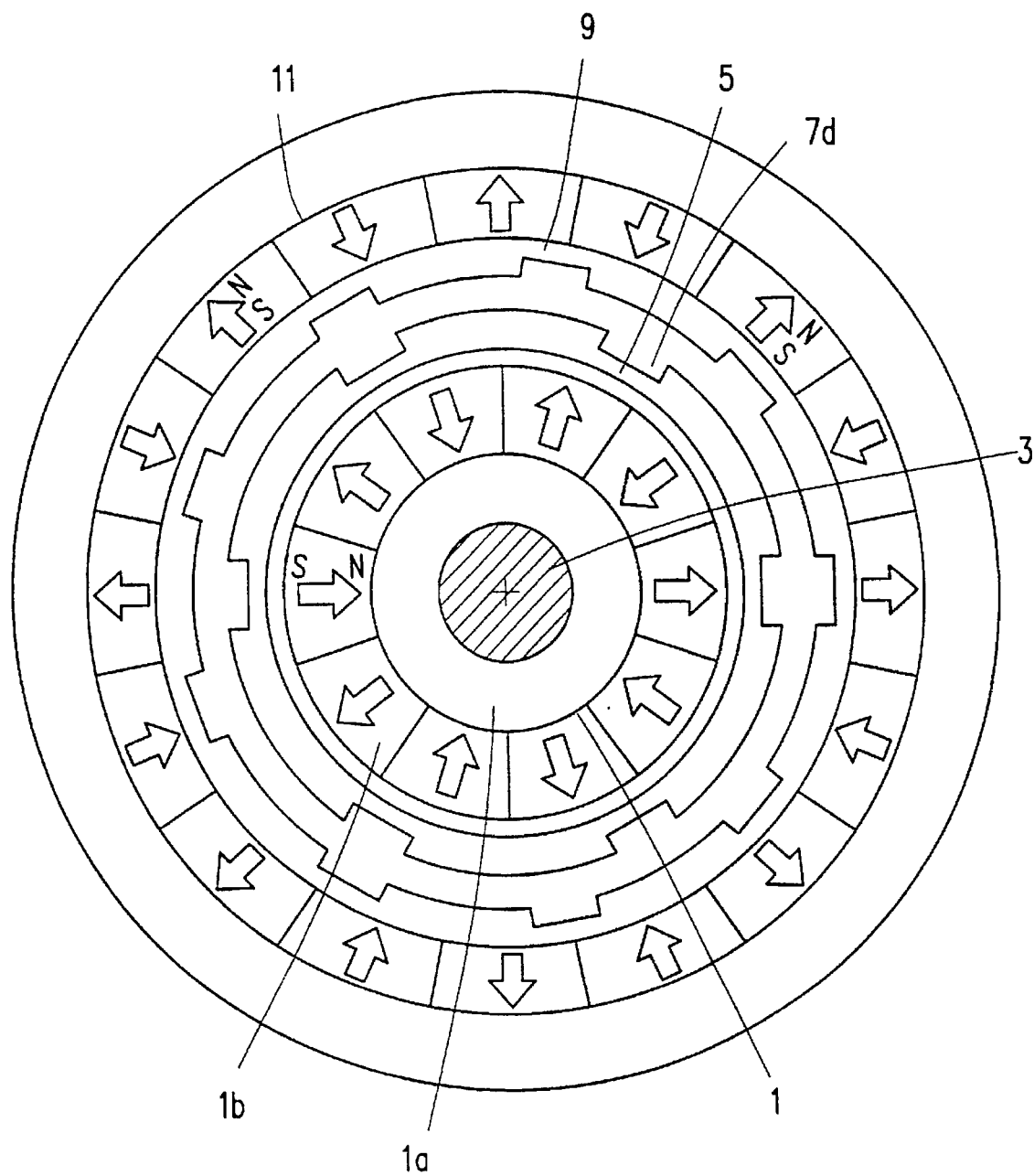
Figure 8:
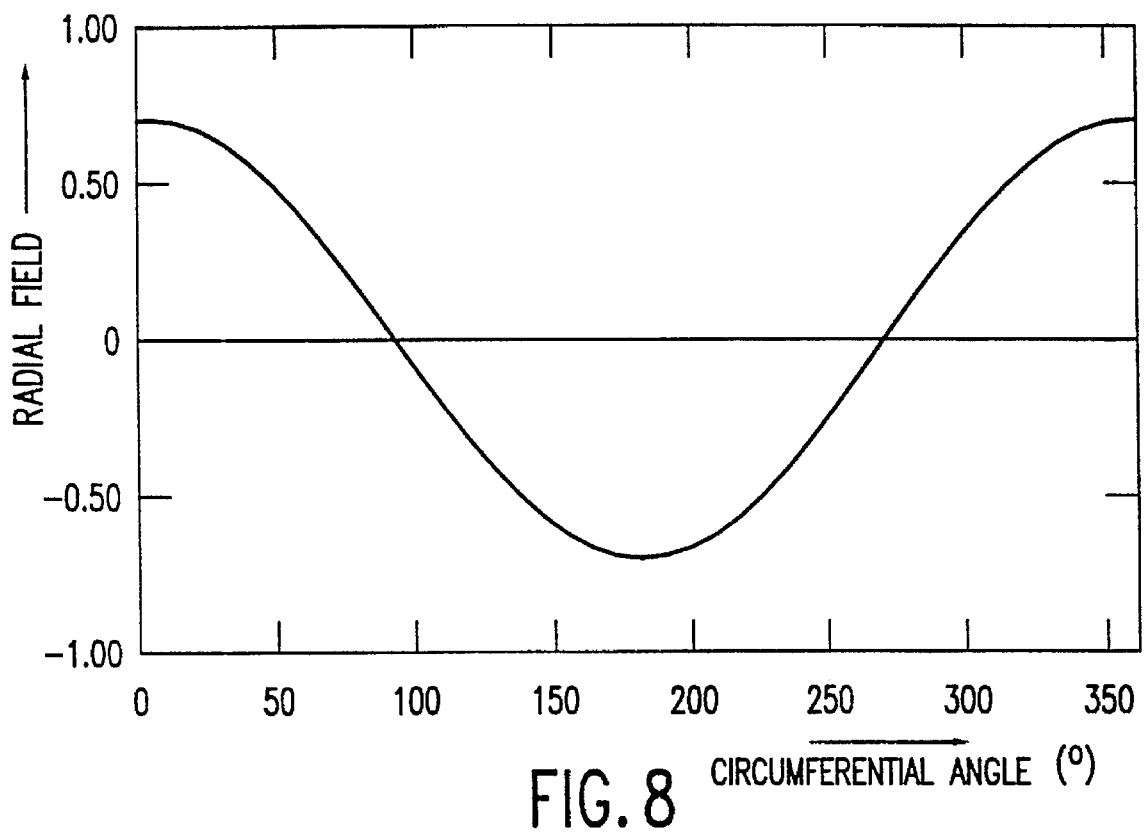
FIG. 8 is a diagram relating to FIG. 1, in which diagram the radial component of the magnetic field produced at the inner side of the iron yoke by the inner structure is plotted as a function of the circumferential angle.
Figure 9:
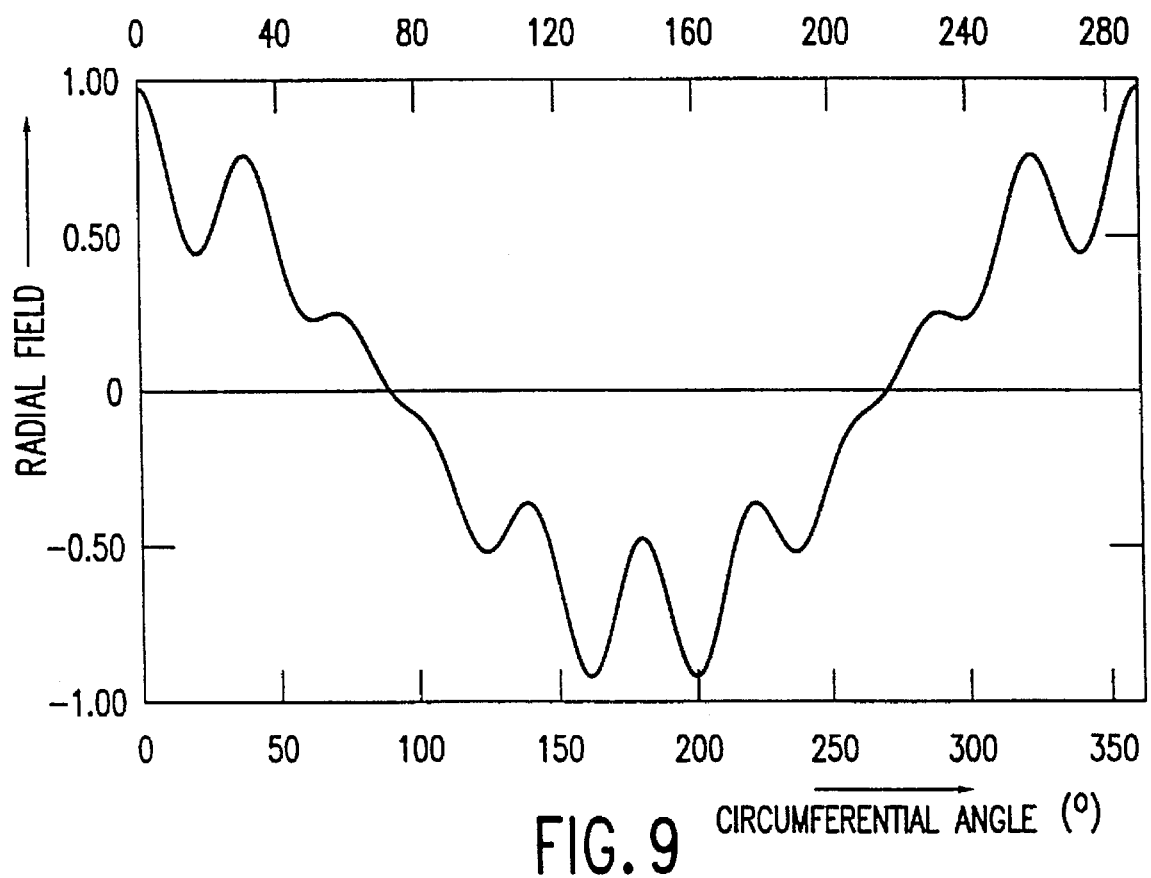
FIG. 9 is a diagram relating to FIG. 1, in which diagram the radial component of the magnetic field produced at the outer side of the iron yoke by the inner structure is plotted as a function of the circumferential angle. This results from the modulation of the magnetic field of FIG. 8 by the toothed iron yoke.
Figure 10:
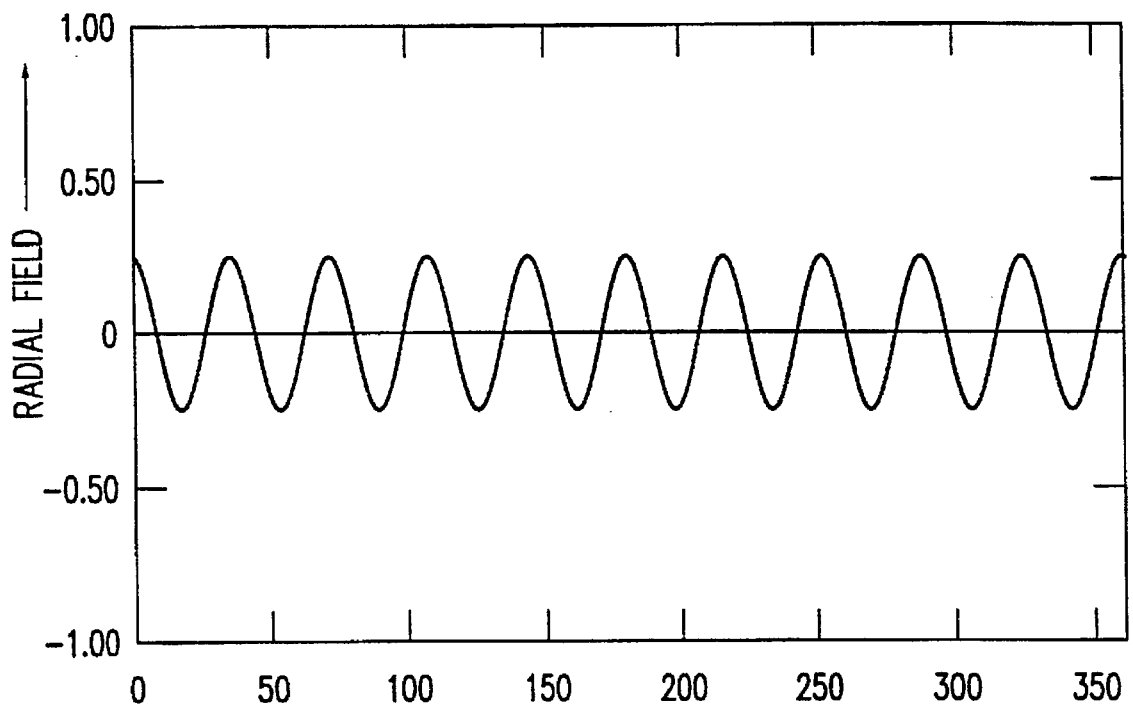
FIG. 10 is a diagram relating to FIG. 1, in which diagram the radial component of the magnetic field produced at the inner side of the outer structure by the outer structure is plotted as a function of the circumferential angle. The influence of the teeth of the iron yoke is not shown for the sake of clarity.
Figure 11:
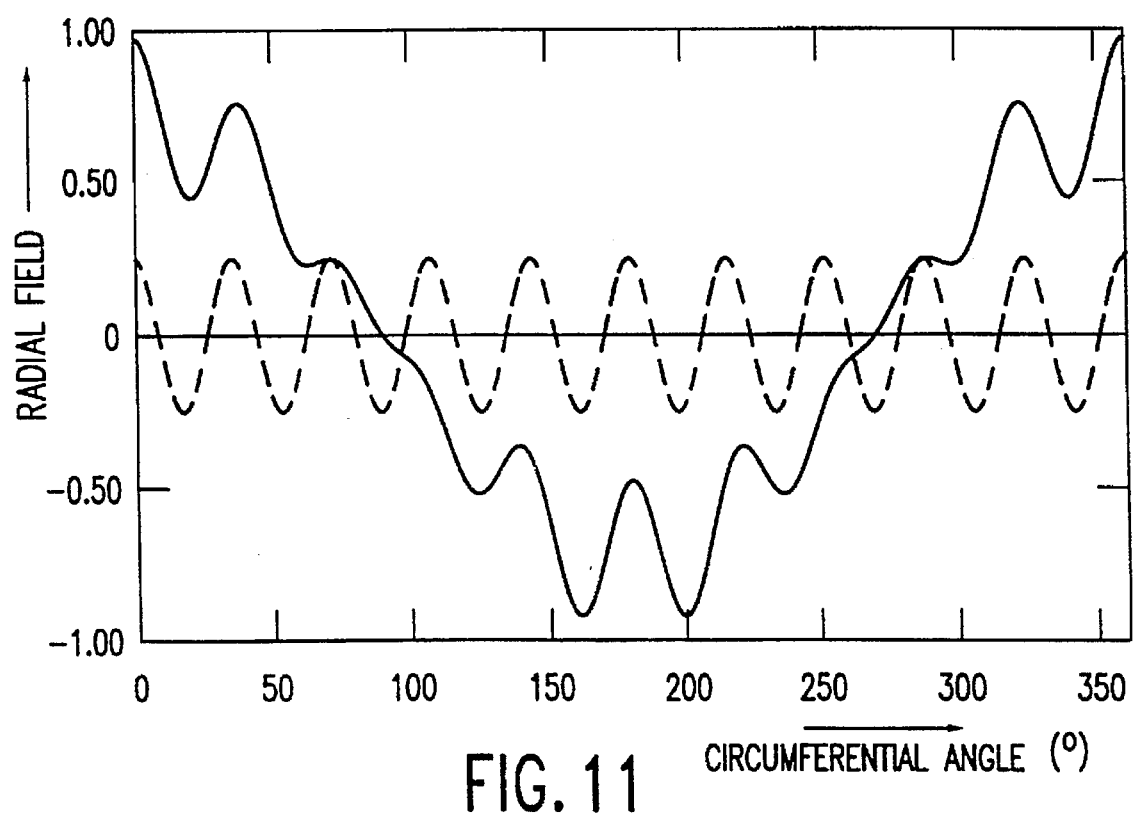
FIG. 11 represents the radial components of the magnetic fields produced in the air gap between the outer structure and the iron yoke as a result of the action of the outer structure (see FIG. 10) and the action of the inner structure (see FIG. 9). This illustrates that field peaks appear at the same positions along the circumference.

We claim:

1. A magnetic drive arrangement comprising a rotor, a ring and a yoke magnetically cooperating with each other and movable relative to one another, one of said rotor, ring and yoke being connected to a drive shaft and another one of said rotor, ring and yoke being stationary, said rotor and ring having permanent magnets producing fields and said yoke having soft-magnetic flux-carrying parts which include an iron yoke part having teeth uniformly spaced along the circumference of the iron yoke part, characterised in that a) permanent magnet structures are provided in the rotor and ring at both sides of the iron yoke part to generate magnetic fields at the sides facing the iron yoke part, which magnetic fields alternately exhibit north poles and south poles along the circumference of the iron yoke part, b) the permanent magnet structures at one side of the iron yoke part exhibiting $p_1$ pairs of north and south poles, the iron yoke part having $Z_1=p_1 \pm N$ teeth at the side facing this one side of the iron yoke part, N being an integer (N=1, 2, 3 . . . ), c) the permanent magnet structures at the other side of the iron yoke part exhibiting N pairs of north and south poles, the iron yoke part having no teeth at the side facing this other side of the iron yoke part.

2. A magnetic drive arrangement as claimed in claim 1, characterised in that the pairs of north and south poles are uniformly spaced along the circumference of the rotor and ring.

3. A magnetic drive arrangement as claimed in claim 1, characterised in that the iron yoke part and the rotor and ring are concentric with one another.

4. A magnetic drive arrangement as claimed in claim 1, characterised in that the iron yoke part is stationary.

5. A magnetic drive arrangement as claimed in claim 1, characterised in that either the rotor or the ring is stationary.

6. A magnetic drive arrangement as claimed in claim 1, characterised in that the magnetic fields in the air gaps at both sides of the iron yoke part extend substantially radially.

7. A magnetic drive arrangement as claimed in claim 1, characterised in that the magnetic fields in the air gaps at both sides of the iron yoke part extend substantially axially.

* * * * *